United States Patent [19]
Fujioka

[11] Patent Number: 4,566,571
[45] Date of Patent: Jan. 28, 1986

[54] CLUTCH DRUM OF AUTOMATIC TRANSMISSION

[75] Inventor: Kazuyoshi Fujioka, Sagamihara, Japan

[73] Assignee: Nissan Motor Co., Ltd., Yokohama, Japan

[21] Appl. No.: 578,814

[22] Filed: Feb. 10, 1984

[30] Foreign Application Priority Data

Feb. 25, 1983 [JP] Japan ................................. 58-30557

[51] Int. Cl.⁴ ............................................. F16D 13/52
[52] U.S. Cl. ................................ 192/70.2; 192/70.19; 192/48.8
[58] Field of Search .................. 192/70.19, 70.2, 48.8, 192/48.91, 87.14, 87.1

[56] References Cited

U.S. PATENT DOCUMENTS

| | | | |
|---|---|---|---|
| 2,613,777 | 10/1952 | Carlson | 192/48.8 |
| 3,353,641 | 11/1967 | Chana | 192/70.2 |
| 3,430,743 | 3/1969 | Fujita | 192/48.8 |
| 3,650,357 | 3/1972 | Nelson | 192/70.2 |
| 3,841,452 | 10/1974 | Neusock | 192/70.2 |
| 4,186,827 | 2/1980 | Spanke | 192/87.1 |

FOREIGN PATENT DOCUMENTS 2125870 12/1982 Fed. Rep. of Germany .

*Primary Examiner*—Ronald H. Lazarus
*Attorney, Agent, or Firm*—Schwartz, Jeffery, Schwaab, Mack, Blumenthal & Evans

[57] ABSTRACT

A cylindrical clutch drum of a clutch for an automatic transmission is formed with a plurality of spline grooves by press forming. Each spline grooves consists of a series of groove portions arranged, end to end, in a line. The width and depth of each spline groove are increased in a stepwise manner, one groove portion after another, toward one groove end. Each groove portion is made by half-blanking with a die having a width corresponding to the width of the groove portion and a length corresponding to the length of the groove portion. Instead of the spline grooves, the clutch drum may be formed with axially extending openings made by blanking. In this case, the width of each opening is increased in a stepwise manner.

10 Claims, 9 Drawing Figures

CLUTCH DRUM OF AUTOMATIC TRANSMISSION

BACKGROUND OF THE INVENTION

The present invention relates to a clutch drum for use in automatic transmissions.

Manual and automatic transmissions are used in motor vehicles. An automatic transmission has planetary gears for providing suitable gear ratios, and clutches for connecting driving members of the gear train. Such clutches have clutch drums of a cylindrical shape. The clutch drum is formed, on its cylindrical wall, axially extending spline grooves for engaging with driving plates or driven plates of the clutch.

Recently, there has been a tendency toward diameter reduction in automatic transmissions because an automatic transmission of a small diameter is advantageous to automobile layout. In a conventional arrangement, the driving and driven plates are disposed around the outer periphery of the planetary gear. This conventional arrangement is detrimental to the diameter reduction of automatic transmissions. There is known another arrangement in which the planetary gear and the driving and driven plates are arranged one behind another along the axial line of the transmission. The diameter of automatic transmissions can be reduced by employing this arrangement. This arrangement, however, requires a clutch drum which is long in the axial direction and has long spline grooves It is very difficult to make long spline grooves by press forming.

SUMMARY OF THE INVENTION

It is an object of the present invention to provide a long clutch drum having long spline grooves or openings which can be easily made by press forming using dies shorter than the resulting spline grooves or openings.

According to the present invention, a clutch drum for use in a clutch mechanism of an automatic transmission comprises a hollow cylindrical member which is formed with a plurality of spline slots for engaging with spline projections of at least one clutch plate so as to permit the transmission of rotation. Each of the spline slots extends longitudinally from a first slot end to a second slot end. The width of each of the spline slots is enlarged in a stepwise manner toward the second slot end so that each of the spline slots consists of a series of longitudinally extending slot portions arranged end to end in a line in order of width.

Preferably, the cylindrical member is made of metal in a sheet shape, and each slot portion is made by applying pressure through a die which is shorter than the spline slots.

The spline slots may be grooves or openings. In the case of the grooves, the cross sectional shape of each groove is enlarged in a stepwise manner, one groove portion after another, toward the second slot end.

DETAILED DESCRIPTION OF THE INVENTION

Figure 1:
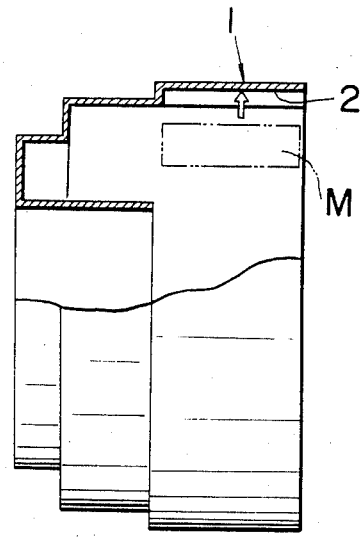
FIG. 1 is a sectional view of a short clutch drum of a conventional type.

FIG. 1 shows a short clutch drum 1 of a conventional type. The clutch drum 1 has spline grooves 2. Each of the spline grooves 2 is formed by press forming using a die M shown by a two-dot chain line in FIG. 1. The die M has a shape corresponding to the shape of the spline groove 2. The die M is pressed, in a radially outward direction as shown by an arrow in FIG. 1, against the inside wall surface of the clutch drum. Each groove 2 is formed by half-blanking. However, it is optional to employ full blanking. In the case of FIG. 1, the clutch drum 1 is short, and accordingly the spline grooves 2 are short. Therefore, it is not difficult to form each spline groove with a single die.

Figure 2:
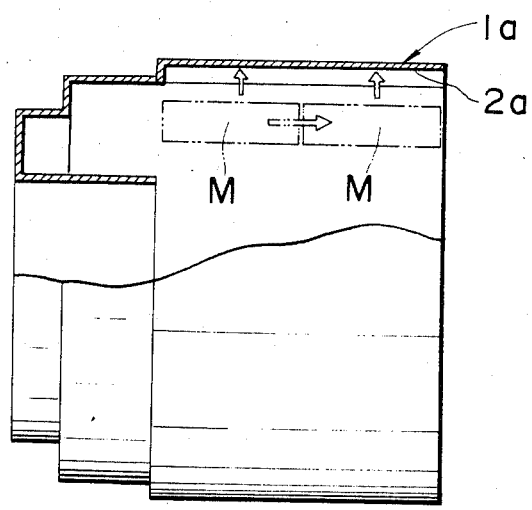
FIG. 2 is a sectional view of a long clutch drum of a conventional type.

FIG. 2 shows a long clutch drum 1a of a conventional type. This clutch drum 1a has spline grooves 2a. The spline grooves 2a are long, so that it is difficult to make these spline grooves 2a. In one method, each groove is formed by a single half-blanking operation as in the case of FIG. 1. This method uses a die which is long enough to make the long spline grooves, and requires a large press machine capable of providing a pressing force strong enough to produce sufficient pressure. Therefore, a conventional press machine used for making the short clutch drum of FIG. 1 can not be used in this method.

In another method, the long spline grooves 2a of FIG. 2 can be made by the conventional press machine used for making the short spline grooves 2 of FIG. 1. This method uses a die M which is shorter than the spline grooves 2a, as shown in FIG. 2. Each spline groove 2a is formed by a plurality of half-blanking operations. The die M is shifted axially after each half-blanking operation, as shown by an arrow of a two-dot chain line in FIG. 2. In this method, however, it is difficult to maintain the alignment of the die M. When the position of the die in one half-blanking operation for making a portion of one spline groove is not aligned with the die position of the preceding half-blanking operation for making the neighboring portion of the same groove, there are formed discontinuities in the groove wall surfaces along which the adjacent wall surfaces are differentially displaced. Accordingly, the spline grooves made by this method tend to have sharp discontinuities at boundaries between two neighboring portions made by different half-blanking operations. Such discontinuities or irregularities make it impossible to insert the driving and driven plates into the clutch drum.

Figure 3:
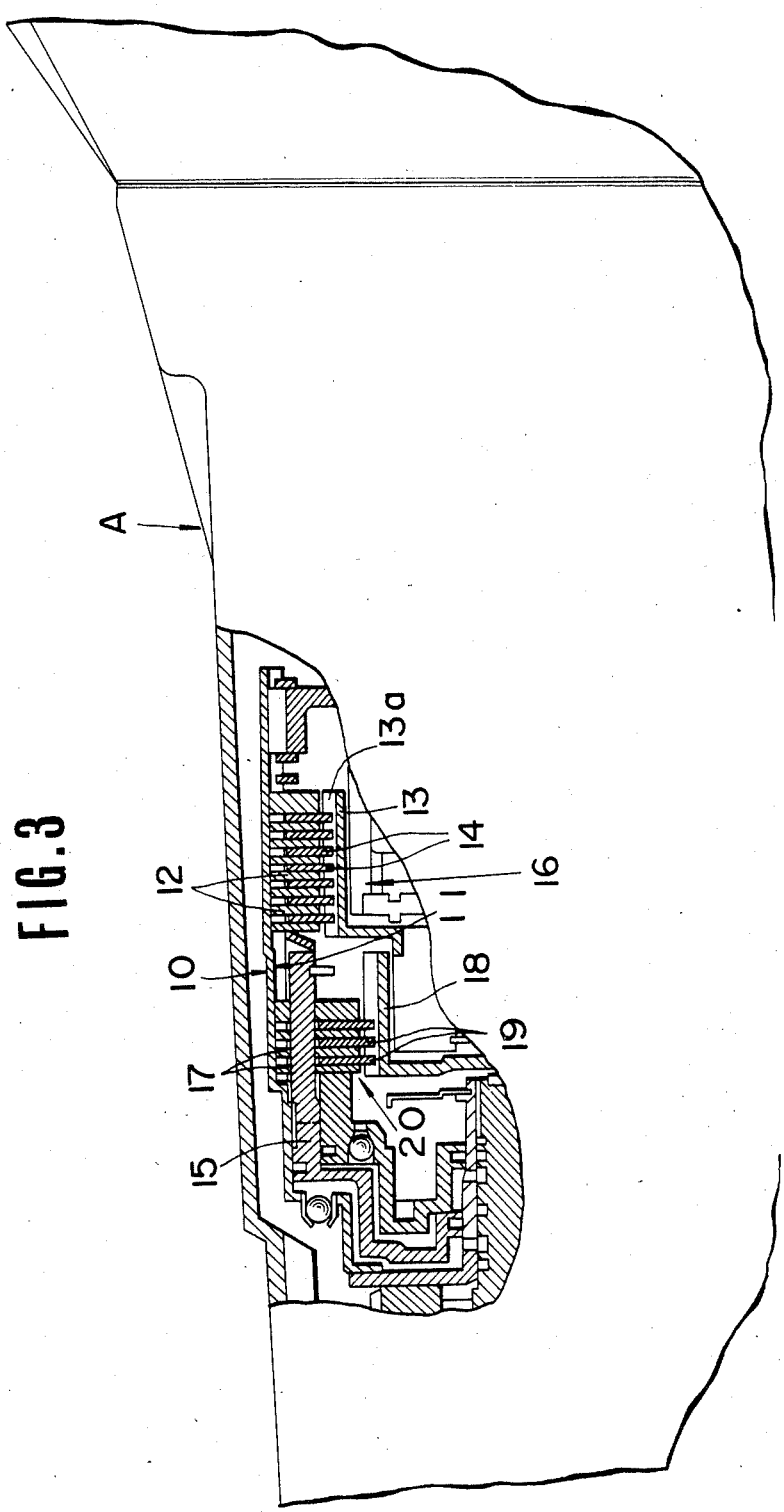
FIG. 3 is a partially sectional view of an automatic transmission using a clutch drum of the present invention.

FIG. 3 shows an automatic transmission A including a long clutch drum 10 of the present invention. The automatic transmission A has a first clutch mechanism 16 and a second clutch mechanism 20.

Figure 4:
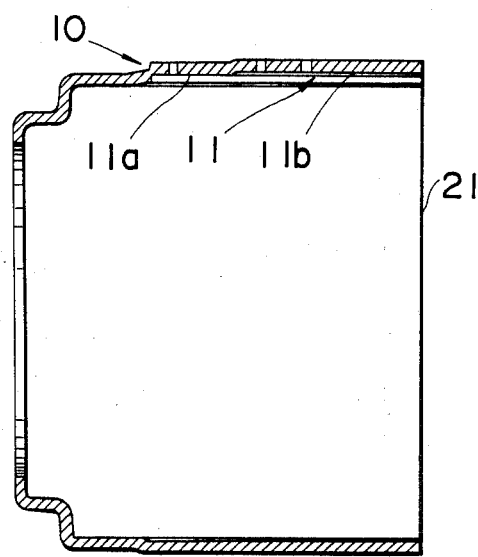
FIG. 4 is a sectional view of a clutch drum according to one embodiment of the present invention.
Figure 5:
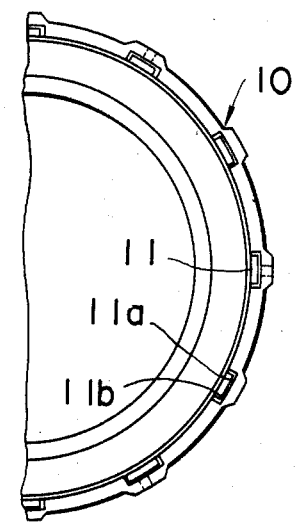
FIG. 5 is a right side view of a portion of the clutch drum of FIG. 4.
Figure 6:
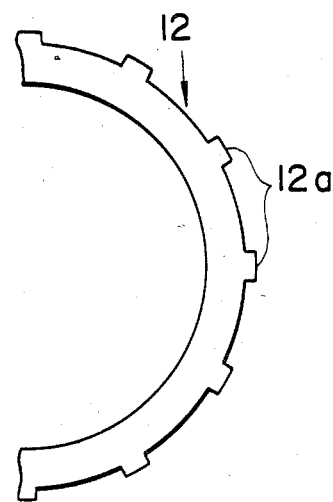
FIG. 6 is an end elevation of a portion of a driving plate.
Figure 7:
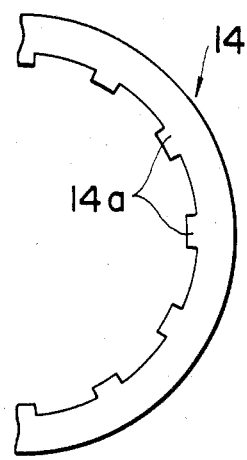
FIG. 7 is an end elevation of a portion of a driven plate.

The clutch drum 10 is formed with long spline grooves 11, as shown in FIGS. 3, 4 and 5. Driving plates 12 of the first clutch mechanism 16 are disposed in the clutch drum 10. Each of the driving plates 12 has a plurality of outward projections 12a arranged around the outer periphery, as shown in FIG. 6. The outward projections 12a of the driving plates 12 are engaged with the spline grooves 11 of the clutch drum 10. Accordingly, the driving plates 12 rotate together with the clutch drum 10, but they are slidable axially relative to the clutch drum 10. A driven drum 13 is disposed in the clutch drum 10. Driven plates 14 of the first clutch mechanism 16 are mounted on the driven drum 13. The driven drum 13 is formed with spline grooves 13a. Each of the driven plates 14 has a plurality of inward projections 14a, as shown in FIG. 7. The inward projections 14a of the driven plates 14 are engaged with the spline grooves 13a of the driven drum 13. The driven plates 14 rotate together with the driven drum 13, but they are slidable axially relative to the driven drum 13. A piston 15 is disposed in the clutch drum 10. The piston 15 is capable of compressing the driving plates 12 and the driven plates 14 of the first clutch mechanism 16. The first clutch mechanism 16 is engaged by applying a compressing force of the piston 15 on the driving and driven plates 12 and 14, and disengaged by removing the force of the piston 15.

Driving and driven plates 19 of the second clutch mechanism 20 are disposed in an inner part (a lefthand part as viewed in FIG. 3) of the clutch drum 10. The driving plates 17 are engaged with the spline grooves 11 of the clutch drum 10. The driven plates 19 are engaged with a driven drum 18 of the second clutch mechanisms 20. The driving plates 12 and 17 which are both engaged with the spline grooves 11 of the clutch drum 10 act as driving members when power is transmitted in one direction. The driving plates 12 and 17 act as driven members when power is transmitted in the opposite direction.

Figure 8:
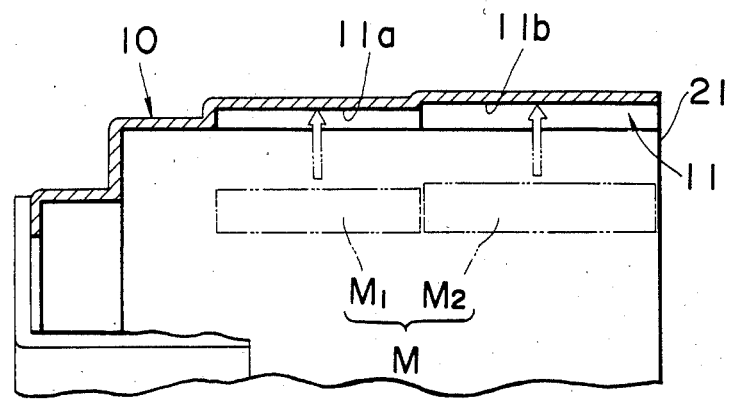
FIG. 8 is a sectional view of a portion of the clutch drum of FIG. 4, showing press forming process.
Figure 9:
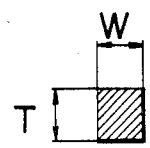
FIG. 9 is a sectional view of a die used for the press forming.

The spline grooves 11 of the clutch drum 10 are formed by press forming. As shown in FIG. 8, the spline grooves 11 are formed by half blanking. In the case of FIG. 8, each of the spline grooves 11 consists of two groove portions, a first groove portion 11a and a second groove portion 11b, which are separated by an imaginary plane normal to the longitudinal direction of the spline groove 11. The first portion 11a of each of the spline grooves 11 is formed with a first die $M_1$ shown by a two-dot chain line in FIG. 8, by a first half-blanking operation. The second portion 11b of each of the spline grooves 11 is formed with a second die $M_2$ by a second half-blanking operation. The first and second dies $M_1$ and $M_2$ are different from each other in size. During the first half-blanking operation, the first die $M_1$ is held at a first axial position corresponding to the first portion 11a. During the second half-blanking operation, the second die $M_2$ is held at a second axial position corresponding to the second portion 11b. The first portion 11a adjacent to an inner end (a left-hand end as viewed in FIG. 8) of the clutch drum 10 is formed first. Subsequently, the second portion 11b adjacent to an inlet end 21 (a right-hand end as viewed in FIG. 8) of the clutch drum 10 is formed. The position of the die is shifted axially from the inner end to the inlet end 21 after the first half-blanking operation. However, it is optional to form the second portion 11b first, and the first section 11b secondly by changing the die position axially from the inlet end 21 to the inner end of the clutch drum 10.

The second die $M_2$ for forming the second portion 11b adjacent to the inlet end 21 of the clutch drum 10 is larger in width W and thickness T. The differences in width W and thickness T between the first and second dies $M_1$ and $M_2$ are so determined that these differences are larger than the magnitude of error in aligning the die $M_1$ and the die $M_2$. Thus, the cross sectional shape of each spline groove is enlarged in a stepwise manner at a boundary between the first portion and the second portion. The cross sectional shape of the first portion 11a can be enclosed by the outline of the cross sectional shape of the second portion 11b.

This design makes it possible to insert the driving plates 12 and 17 from the inlet end 21 of the clutch drum 10 to the inner ends of the spline grooves 11. Furthermore this arrangement can absorb errors in press forming, so that the working accuracy can be decreased.

In the example of FIG. 8, each spline groove 11 is formed by two half-blanking operations with two dies $M_1$ and $M_2$. However, three or more dies may be used for each spline groove. In this case, each spline groove consists of three or more portions formed by three or more half-blanking operations. The number of dies used for making each groove is equal to the number of the half-blanking operations required for each groove. The cross sectional shape of each groove is enlarged in a stepwise manner, one portion after another, toward the inlet end 21.

In the illustrated embodiment, the clutch drum 10 is formed with the spline grooves made by half-blanking. However, the splines of the clutch drum 10 can be made by blanking if the strength of the clutch drum 10 can be maintained. In this case, the clutch drum 10 is formed with a plurality of axially extending openings, whose width is increased in a stepwise manner toward the inlet end 21.

According to the present invention, irregularities formed on the groove walls at boundaries between two neighboring portions formed by different forming operations because of the mis-alignment of the dies can be absorbed by the increases of the size of the spline groove. Therefore, the driving and driven plates can be inserted into the clutch drum. Furthermore, the working accuracy of the press forming can be decreased, so that the clutch drum of the present invention is very advantageous to mass production.

What is claimed is:

1. In a clutch mechanism of an automatic transmission including an improved clutch drum wherein the improved clutch drum comprises:
    a hollow cylindrical member for transmitting rotation to at least one clutch plate having spline projections;
    a plurality of spline slots, disposed in said hollow cylindrical member, for engaging the spline projections of the clutch plate, wherein each of the spline slots extends longitudinally from a first slot end to a second slot end, wherein each of the spline slots includes a plurality of longitudinally extending slot portions, wherein the slot portions have varying widths, and wherein the slot portions are arranged in order of increasing width from the first slot end to the second slot end.

2. A clutch drum according to claim 1, wherein said cylindrical member comprises sheet metal and wherein each slot portion is made by applying pressure through a die which is shorter than said spline slots.

3. A clutch drum according to claim 2, wherein each slot portion has two side boundaries extending substantially in parallel with an axis of said cylindrical member.

4. A clutch drum according to claim 3, wherein said spline slots comprise axially extending grooves each having two side walls and a bottom, wherein said slot portions comprise groove portions, and wherein a cross sectional dimension of each groove portion increases in a stepwise manner, one groove portion after another, toward said second slot end.

5. A clutch drum according to claim 4, wherein the width of each groove portion increases in a stepwise manner, one groove portion after another, toward said second slot end, and wherein the depth of each groove portion increases in a stepwise manner, one groove portion after another, toward said second slot end.

6. A clutch drum according to claim 5, wherein the cross sectional shape of each groove portion is rectangular, and wherein side walls of each groove portion are substantially flat and substantially parallel with one another.

7. A clutch drum according to claim 6, wherein said cylindrical member further comprises a cylindrical wall disposed between a first drum end and a second drum end, wherein said first slot end of each groove is disposed substantially near said first drum end, wherein each of said grooves extends substantially in an axial direction on said cylindrical member from said first slot end to said second drum end, wherein said second slot end of each groove is disposed substantially near second drum end, wherein said second drum end is open, and wherein said second slot end of each groove is arranged to open toward said second drum end, for allowing said clutch plate to be inserted from said second drum end into said cylindrical member.

8. A clutch drum according to claim 7, wherein each groove portion is formed by applying pressure through a die having a width corresponding to the width of the groove portion and a length corresponding to the length of the groove portion.

9. A clutch drum according to claim 8, wherein said cylindrical member is made by press forming.

10. A clutch drum according to claim 3, wherein said spline slots comprise axially extending openings, and wherein said slot portions are opening portions.

* * * * *